United States Patent [19]

Hormadaly

[11] Patent Number: 4,537,703

[45] Date of Patent: Aug. 27, 1985

[54] BOROSILICATE GLASS COMPOSITIONS

[75] Inventor: Jacob Hormadaly, Wilmington, Del.

[73] Assignee: E. I. Du Pont De Nemours and Company, Wilmington, Del.

[21] Appl. No.: 562,966

[22] Filed: Dec. 19, 1983

[51] Int. Cl.$^3$ .......................... C03C 3/08; C03C 3/10; H01B 1/06

[52] U.S. Cl. .................................... 252/518; 501/17; 501/20; 501/21; 501/58; 501/65; 501/77

[58] Field of Search .............................. 501/77, 16–18, 501/20, 58, 65, 21; 252/518

[56] References Cited

U.S. PATENT DOCUMENTS

| | | | |
|---|---|---|---|
| 2,757,105 | 7/1956 | Terry | 501/16 |
| 3,413,133 | 11/1968 | Stalego | 501/77 |
| 4,065,743 | 12/1977 | Wahlers et al. | 501/17 |
| 4,091,144 | 5/1978 | Dresner et al. | 252/518 |
| 4,173,518 | 11/1979 | Yamada et al. | 204/67 |
| 4,215,020 | 7/1980 | Wahlers et al. | 501/17 |
| 4,225,468 | 9/1980 | Donohue et al. | 252/518 |
| 4,244,722 | 1/1981 | Tsuya et al. | 264/212 |
| 4,362,656 | 12/1982 | Hormadaly | 252/518 |
| 4,461,841 | 7/1984 | Harada et al. | 501/77 |

FOREIGN PATENT DOCUMENTS 57-77041  5/1982  Japan ..................................... 501/17

*Primary Examiner*—Helen M. McCarthy

[57] ABSTRACT

The invention is directed to a barium borosilicate glass which is free of Bi, Cd and Pb. The glass, which also contains small amounts of NiO, is especially useful as a binder for thick film resistor compositions to be used for making low end resistors.

5 Claims, No Drawings

BOROSILICATE GLASS COMPOSITIONS

FIELD OF INVENTION

The invention relates to borosilicate glass compositions which are especially useful as the binder component for thick film resistor compositions.

BACKGROUND OF THE INVENTION

Thick film materials are mixtures of metals, metallic oxides, glass and/or ceramic powders dispersed in an organic medium. These materials, which are applied to nonconductive substrates to form conductive, resistive or insulating films, are used in a wide variety of electronic and light electrical components.

The properties of such thick film compositions depend on the specific constituents of the compositions. Most of such thick film compositions contain three major components. A conductive phase determines the electrical properties and influences the mechanical properties of the final film. A binder, usually a glass and/or crystalline oxide, holds the thick film together and bonds it to a substrate, and an organic medium (vehicle) acts as a dispersing medium and influences the application characteristics of the composition and particularly its rheology.

High stability and low process sensitivity are critical requirements for thick film resistors in microcircuit applications. In particular, it is necessary that resistivity ($R_{av}$) of a resistor be stable over a wide range of temperature conditions. Thus, the thermal coefficient of resistance (TCR) is a critical variable in any thick film resistor. Because thick film resistor compositions are comprised of a functional (conductive) phase and a permanent binder phase, the properties of the conductive and binder phases and their interactions with each other and with the substrate affect both resistivity and TCR.

Glass is most frequently used as the inorganic binder for thick film resistors. Frequently used glass frits have been borosilicate frits, such as barium, calcium or other alkaline earth borosilicate frits. The preparation of such glass frits is well known and consists, for example, in melting together the constituents of the glass in the form of their oxides and pouring such molten composition into water to form the frit. The batch ingredients may, of course, be any compound that will yield the desired oxides under the usual conditions of frit production. For example, boric oxide will be obtained from boric acid; silicon dioxide will be produced from flint; barium oxide will be produced from barium carbonate; etc. The glass is preferably milled in a ball mill with water to reduce the particle size of the frit and to obtain a frit of substantially uniform size.

Despite the wide variety of glasses which have been used as a binder for thick film resistor materials, it has heretofore been difficult to manufacture thick film resistors over a wide range of resistance values using tin oxide pyrochlore-based resistor materials. In particular, there is a significant need for inorganic binder materials with which such pyrochlore-based resistor materials can be formulated to make low end resistors, i.e., those having resistance values in the range of 10Ω to 30kΩ.

SUMMARY OF THE INVENTION

The invention is, therefore, directed in its primary aspect to a glass composition which is substantially free of Bi, Cd and Pb comprising by mole %:

A. 50–85% of a material selected from the group consisting of 20–50% $B_2O_3$, 15–40% $SiO_2$ and 0.1–5% $SnO_2$ and mixtures thereof, and
B. 50–15% of a material selected from the group consisting of 10–30% BaO, 2–12% CoO, 1–10% NiO and mixtures thereof, further characterized in that
(1) the mole ratio $B_2O_3/SiO_2 \geq 0.8$; and
(2) $\Sigma(B_2O_3 + SiO_2) \geq 50$.

In a secondary aspect, the invention is directed to a screen-printable thick film resistor composition comprising a dispersion in organic medium of an admixture of finely divided particles of tin oxide pyrochlore-based material and the above-described glass composition.

In a still further aspect, the invention is directed to a resistor comprising a patterned thin layer of the above-described dispersion, which has been dried and fired in a nonoxidizing atmosphere to effect volatilization of the organic medium and liquid phase sintering of the inorganic binder.

In this Summary of the Invention, as well as in the Detailed Description of the Invention which follows, all percentages are on a molar basis relative to the total glass composition unless otherwise indicated.

DETAILED DESCRIPTION OF THE INVENTION

The glass composition of the invention is comprised basically of glass-forming materials and glass-modifying materials. By the term "glass-forming material" is meant a material which upon melting and cooling will form a glass by itself without the addition of other materials. The term "glass-forming material" also includes "conditional" glass-forming materials which become part of the glass network. By conditional glass-forming material is meant material which upon melting and cooling will form a glass only if other metal oxides are present. Despite the fact that the materials in Group A are characterized as "glass formers", this does not mean that they are necessarily functioning as glass formers in these glass compositions. The term refers only to their general characterization in the art as being capable of glass formation under certain circumstances. Suitable glass-forming materials and conditional glass formers are $B_2O_3$, $SiO_2$ and $SnO_2$. All are essential to the compositions of the invention.

The boron-containing glass former must constitute at least 25% of the glass composition in order that the viscosity of the glass be suitable for application in thick film resistor systems. However, it must not exceed 50% and preferably not more than 40% lest the humidity stability of the resistor in which it is used be too low.

Similarly, the silica component must be at least 15% of the glass in order that the glass has satisfactory durability and an appropriate coefficient of expansion for the particular ceramic substrate on which thick film resistor paste is used. Nevertheless, the amount of $SiO_2$ should not exceed 40%. When higher amounts of $SiO_2$ are used, the softening point of the glass may be elevated excessively and the TCR of the resultant resistor becomes too low. In addition, the glass-forming portion of the glass must also contain 0.1–5% $SnO_2$. The $SnO_2$ is added to lower the resistance of the resistor system in which the glass is used. The amount of $SnO_2$ used for this purpose is, however, limited by the comparatively low solubility of $SnO_2$ in glass systems of the type described here. For this reason, it is preferred to use no more than 4% $SnO_2$. Nevertheless, at least 0.5% and preferably 2% $SnO_2$ is needed to lower significantly the resistance of the resistors made from compositions containing this material as inorganic binder.

In addition to the above-described limitations on the amount of each glass former or conditional glass former which can be used, it is essential that the glass-forming materials constitute 50-85% of the glass formulation. Also, the total amount of $B_2O_3$ and $SiO_2$ must themselves constitute at least 50% of the glass composition and 60-70% is preferred. In addition, the mole ratio $B_2O_3/SiO_2$ must be at least 0.8.

Essential glass-modifying materials for use in the invention are BaO and NiO. The composition must contain 10-30% BaO and preferably 12-30% BaO. At least 10% BaO is needed to obtain a suitably low softening point for the glass, but if more than 30% BaO is used, the coefficient of expansion of the glass becomes excessively high and stability of the glass overall is adversely affected as well.

In addition to the above-described essential glass modifiers, the composition of the invention may contain up to 12% of oxides of alkaline earth metals having atomic numbers 12-38, i.e., Mg, Ca, Sr and mixtures thereof. It is preferred that they contain 3-10% of such alkaline earth oxides which, when substituted for some of the BaO, tend to lower the coefficient of expansion less than BaO. Moreover, 1-10% NiO must be in the composition to obtain suitable resistance properties. At least 1% NiO is needed to avoid too high resistance levels in the resistor compositions it is used in and 4% NiO is preferred. On the other hand, if more than 10% NiO is used, the resistors made therefrom exhibit too highly negative TCR values. A maximum level of 8% NiO is preferred for most applications.

Equally important as the concentration of the individual glass modifiers is the total concentration of all glass modifiers which must be within the range of 15-50% and preferably 25-35%.

It will be recognized that the glass compositions of the invention must not contain any materials which are reducible under the nonoxidizing conditions encountered in the use of these glasses in thick film resistor compositions. For this reason, reducible oxides such as $Bi_2O_3$, CdO and PbO must not be present in the composition in any significant amount; that is, they may be present in only very small amounts since the reduced materials therefrom adversely effect the stability of the glass. In addition, the exclusion of these compounds also eliminates any the toxicity which might arise from the presence in the glass of oxides of Pb, Bi and Cd.

It is particularly preferred that the binder be comprised of 95-99.9% by weight of the above-described bismuth-, cadmium- and lead-free glass and 5-0.1% wt. of a metal flouride selected from the group consisting of $CaF_2$, $BaF_2$, $MgF_2$, $SrF_2$, NaF, LiF, KF and $NiF_2$. The use of such metal flourides with the frit produces a decrease in resistance of the resistors made therefrom.

The glasses of this invention are prepared with conventional glassmaking techniques by mixing the desired components in the desired proportions and heating the mixture to form a melt. As is well known in the art, heating is conducted to a peak temperature and for a time such that the melt becomes entirely liquid and homogeneous. In the present work, the components were premixed by shaking in a polyethylene jar with plastic balls and then melted in a platinum crucible at the desired temperature. The melt was heated at a peak temperature of 1100°-1400° C. for a period of 1½ hours and then poured into cold water. The maximum temperature of the water during quenching was kept low by increasing the water-to-melt volumetric ratio. After separation from water, the crude frit is freed from residual water by drying in air or by displacing the water by rinsing with methanol. The crude frit is then ball milled for 3-15 hours in alumina containers using alumina balls. Residual alumina picked up by the materials, if any, is not within the observable limit as measured by X-ray diffraction analysis.

After discharging the milled frit slurry from the mill, excess solvent is removed by decantation and the frit powder is dried in an oven at 110°±10° C. The dried powder is then screened through a 325-mesh screen to remove any large particles.

When the glass frits of the invention are used as the binder component of thick film resistor compositions, an important property of the frit is to aid the liquid phase sintering of the inorganic crystalline particulate materials and form noncrystalline (amorphous) or crystalline materials by devitrification during the heating-cooling cycle (firing cycle) in the preparation of such thick film resistors. This devitrification process can yield either a single crystalline phase having the same composition as the precursor noncrystalline (glassy) material or multiple crystalline phases with different compositions from that of the precursor glassy material.

RESISTOR MATERIALS

The glass compositions of the invention have been found to be particularly effective in the $SnO/SnO_2/Ta_2O_5/Nb_2O_5$ pyrochlore-based resistors described in applicant's U.S. patent application Ser. No. 460,572, filed Jan. 24, 1983 which is incorporated herein by reference. The glasses of the invention can advantageously by admixed with the glasses of copending U.S. patent application Ser. No. 562,965 (EL-0179), filed concurrently herewith for use in such resistor compositions.

ORGANIC MEDIUM

The main purpose of the organic medium is to serve as a vehicle for dispersion of the finely divided solids of the composition in such form that it can readily be applied to a ceramic or other substrate. Thus, the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wetability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin in a solvent and, frequently, a solvent solution containing both resin and thixotropic agent. The solvent usually boils within the range of 130°-350° C.

By far, the most frequently used resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to solids in the dispersions can vary considerably and depends upon the manner in which the dispersion is to be applied and the kind of organic medium used. Normally, to achieve good coverage, the dispersions will contain complementally by weight 60–90% solids and 40–10% organic medium. Such dispersions are usually of semifluid consistency and are referred to commonly as "pastes".

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa · s) | |
|---|---|---|
| 0.2 | 100–5000 | — |
| | 300–2000 | Preferred |
| | 600–1500 | Most preferred |
| 4 | 40–400 | — |
| | 100–250 | Preferred |
| | 140–200 | Most preferred |
| 384 | 7–40 | — |
| | 10–25 | Preferred |
| | 12–18 | Most preferred |

The amount and type of organic medium (vehicle) utilized is determined mainly by the final desired formulation viscosity and print thickness.

FORMULATION AND APPLICATION

In the preparation of the composition of the present invention, the particulate inorganic solids are mixed with the organic medium and dispersed with suitable equipment, such as a three-roll mill, to form a suspension, resulting in a composition for which the viscosity will be in the range of about 100–150 Pa.s at a shear rate of 4 sec$^{-1}$.

In the examples of which follow, the formulation was carried out in the following manner.

The ingredients of the paste, minus about 5% wt. of the estimated organic components which will be required, are weighed together in a container. The components are then vigorously mixed to form a uniform blend; then the blend is passed through dispersing equipment such as a three-roll mill to achieve a good dispersion of particles. A Hegman gauge is used to determine the state of dispersion of the particles in the paste. This instrument consists of a channel in a block of steel that is 25 $\mu$m deep (1 mil) on one end and ramps up to zero depth at the other end. A blade is used to draw down paste along the length of the channel. Scratches will appear in the channel where the agglomerates' diameter is greater than the channel depth. A satisfactory dispersion will give a fourth scratch point of 10–18 $\mu$m typically. The point at which half of the channel is uncovered with a well dispersed paste is between 3 and 8 $\mu$m typically. Fourth scratch measurement of 20 $\mu$m and "half-channel" measurements of 10 $\mu$m indicate a poorly dispersed suspension.

The remaining 5% of the organic components of the paste is then added and the resin content of the paste is adjusted for proper screen-printing rheology.

The composition is then applied to a substrate such as alumina, usually by the process of screen printing, to a wet thickness of about 30–80 microns, preferably 35–70 microns and most preferably 40–50 microns. The electrode compositions of this invention can be printed onto the substrates either by using an automatic printer or a hand printer in the conventional manner. Preferably, automatic screen printing techniques are employed using a 200- to 325-mesh screen. The printed pattern is then dried at below 200° C., e.g., about 150° C., for about 5–15 minutes before firing. Firing to effect sintering of both the inorganic binder and the finely divided particles of metal is preferably done in a controlled atmosphere belt conveyor furnace with a temperature profile that will allow burnout of the organic matter at about 300°–600° C., a period of maximum temperature of about 800°–950° C. lasting about 5–15 minutes, followed by a controlled cooldown cycle to prevent over sintering, unwanted chemical reactions at intermediate temperatures or substrate fracture which can occur from too rapid cooldown. By controlled atmosphere is meant a nonoxidizing atmosphere such as nitrogen, argon or mixtures thereof. The overall firing procedure will preferably extend over a period of about 1 hour, with 20–25 minutes to reach the firing temperature, about 10 minutes at the firing temperature and about 20–25 minutes in cooldown. In some instances, total cycle times as short as 30 minutes can be used.

SAMPLE PREPARATION

Samples to be tested for temperature coefficient of resistance (TCR) are prepared as follows:

A pattern of the resistor formulation to be tested is screen printed upon each of ten coded Alsimag 614 1×1" ceramic substrates and allowed to equilibrate at room temperature and then dried at 150° C. The mean thickness of each set of ten dried films before firing must be 22–28 microns as measured by a Brush Surfanalyzer. The dried and printed substrate is then fired for about 60 minutes using a cycle of heating at 35° C. per minute to 900° C., dwell at 900° C. for 9 to 10 minutes and cooled at a rate of 30° C. per minute to ambient temperature.

RESISTANCE MEASUREMENT AND CALCULATIONS

Substrates prepared as described above are mounted on terminal posts within a controlled temperature chamber and electrically connected to a digital ohm meter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

The hot and cold temperature coefficients of resistance (TCR) are calculated as follows:

$$\text{Hot TCR} = \frac{R_{125°\,C.} - R_{25°\,C.}}{R_{25°\,C.}} \times (10{,}000) \text{ ppm/°C.}$$

$$\text{Cold TCR} = \frac{R_{-55°\,C.} - R_{25°\,C.}}{R_{25°\,C.}} \times (-12{,}500) \text{ ppm/°C.}$$

The values of $R_{25°\,C.}$ and Hot and Cold TCR are averaged and $R_{25°\,C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\text{Average Measured Resistance} \times \text{Average Dry Print Thickness, microns}}{25 \text{ microns}}$$

COEFFICIENT OF VARIANCE

The coefficient of variance (CV) is a function of the average and individual resistances for the resistors tested and is represented by the relationship $\sigma/R_{av}$, wherein $$\sigma = \sqrt{\frac{\Sigma_i(R_i - R_{av})^2}{n-1}}$$

$R_1$ = measured resistance of individual sample.
$R_{av}$ = calculated average resistance of all samples ($\Sigma_i R_i/n$)
n = number of samples
CV = $(\sigma/R_{av}) \times 100$ (%)

EXAMPLES

Preparation of Glass Frit

In the examples which follow, the glass frit compositions listed in Table 1 below were made by the above described procedure. All were single phase glasses with no secondary phases present.

TABLE 1

| Glass No. | GLASS COMPOSITIONS (mole %) | | | |
|---|---|---|---|---|
| | I | II | III | IV |
| BaO | 19.8 | 17.2 | 13.0 | 20.0 |
| CaO | — | 8.8 | 5.0 | — |
| MgO | 5.0 | — | 5.0 | 10.0 |
| NiO | 5.0 | 7.0 | 10.0 | — |
| B₂O₃ | 45.1 | 34.4 | 33.0 | 45.0 |
| SiO₂ | 23.1 | 30.2 | 30.0 | 23.0 |
| SnO₂ | — | 2.3 | 4.0 | — |
| ZrO₂ | 2.0 | — | — | 2.0 |

Preparation of Conductive Phase

A tantalum-tin pyrochlore composition corresponding to the formula

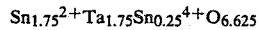
$$Sn_{1.75}^{2+}Ta_{1.75}Sn_{0.25}^{4+}O_{6.625}$$

was prepared by ball milling 71.42 g of SnO, 117.16 g of Ta₂O₅ and 11.42 g of SnO₂ using water as a dispersing medium. Upon completion of thorough mixing, the admixtures were dried and placed in alumina crucibles and heated in a furnace containing a nonoxidizing (N₂) atmosphere. The mixtures were then heated for 24 hours at 872° C.±10° C. to form the pyrochlore. The preparation and use of such pyrochlores is described in applicant's copending U.S. patent application Ser. No. 460,572, filed Jan. 24, 1983.

The above-described pyrochlore was then divided into 50 and 100 g quantities, each of which was combined with 450 and 400 g respectively of purified SnO₂ and ball milled for one hour using distilled water as a liquid milling medium. Upon completion of ball mixing, the mixtures of pyrochlore and SnO₂ were placed in a nitrogen furnace and fired for 25 hours at 875° C. The conductive phase material prepared in this manner was then used to formulate a thick film resistor paste having the composition given above. In the following examples, the 50/450 and 100/400 conductive phases are referred to as Conductive A and Conductive B respectively.

In the Examples which follow, the glasses listed in Table 1 were prepared and fabricated and the resistors therefrom tested by the procedures outlined in detail above.

EXAMPLES 1–11

Using the four glasses described in Table 1, eleven series of resistors were fabricated by the above-described procedures. The composition of the thick film resistor compositions materials and the electrical properties of the fired resistors prepared therefrom are given in Table 2, which follows:

TABLE 2

Composition of Thick Film Materials and Electrical Properties of Resistors Therefrom - Glass Variations

| Example No. | 1 | 2 | 3 | 4 | 5 | 6 | 7 | 8 | 9 | 10 | 11 |
|---|---|---|---|---|---|---|---|---|---|---|---|
| Thick Film Composition | | | | | | | | | | | |
| Conductive A | 56.00 | 56.00 | 56.00 | 49.00 | 49.00 | 49.00 | — | — | — | — | — |
| Conductive B | — | — | — | — | — | — | 49.00 | 52.00 | 44.00 | 44.00 | 44.00 |
| Glass I | 17.76 | — | — | 24.76 | — | 10.90 | — | 21.80 | — | 19.34 | 5.01 |
| Glass II | — | 17.76 | — | — | 24.76 | 13.86 | 24.80 | — | — | — | — |
| Glass III | — | — | 17.76 | — | — | — | — | — | — | — | — |
| Glass IV | — | — | — | — | — | — | — | — | 19.34 | — | 14.33 |
| CaF₂ | 0.24 | 0.24 | 0.24 | 0.24 | 0.24 | 0.24 | 0.24 | 0.24 | 0.24 | 0.24 | 0.24 |
| SiO₂ | — | — | — | — | — | — | — | — | 10.42 | 10.42 | 10.42 |
| Organics | 26.00 | 26.00 | 26.00 | 26.00 | 26.00 | 26.00 | 25.96 | 25.96 | 26.00 | 26.00 | 26.00 |

TABLE 2-continued

Composition of Thick Film Materials and Electrical Properties of Resistors Therefrom - Glass Variations

| Example No. | 1 | 2 | 3 | 4 | 5 | 6 | 7 | 8 | 9 | 10 | 11 |
|---|---|---|---|---|---|---|---|---|---|---|---|
| Resistor Electrical Properties | | | | | | | | | | | |
| $R_{av}(k\Omega/\square)$ | 63.597 | 13.50 | 19.724 | 163.973 | 23.457 | 28.045 | 27.495 | 255.300 | 2767.0 | 431.42 | 1044.0 |
| $\sigma_R(k\Omega/\square)$ | ±1.787 | ±0.258 | ±0.365 | ±13.272 | ±0.655 | ±0.753 | ±1.082 | ±16.977 | ±196.2 | ±26.613 | ±62.6 |
| $CV_R(\%)$ | 2.81 | 1.89 | 1.85 | 8.09 | 2.79 | 2.69 | 3.94 | 6.64 | 7.09 | 6.17 | 6.00 |
| $HTCR_{av}(ppm/°C.)$ | +204.3 | +20.1 | +29.9 | +51.3 | −30.1 | +40.7 | −260.5 | +45.6 | +29.0 | −54.5 | +103.0 |
| $\sigma_{HTCR}(ppm/°C.)$ | ±8.4 | ±15.9 | ±6.6 | ±11.0 | ±7.9 | ±7.6 | ±16.7 | ±3.9 | ±10.6 | ±5.0 | ±6.2 |
| $CV_{HTCR}(\%)$ | 4.1 | 79.1 | 22.0 | 21.3 | 26.2 | 18.6 | 6.4 | 8.5 | 36.6 | 9.2 | 6.0 |
| DT (μ) | 24.1 | 24.7 | 22.6 | 21.8 | 21.4 | 24.5 | 24.2 | 23.8 | 25.9 | 27.6 | 23.4 |
| $R_{av}(k\Omega/\square/mil)$ | 59.259 | 13.056 | 17.83 | 142.984 | 20.081 | 27.484 | 26.616 | 273.522 | 2867.0 | 476.29 | 977.0 |

The foregoing data show that a wide useful range of resistors can be made using the glasses of the invention in all of which the TCR span is quite desirably small. It was also observed that the resistors exhibited virtually no staining and that size of the resistors had essentially no effect on their resistivity.

EXAMPLES 12-16

Using glass II, a series of resistors was prepared in which the proportion of $SnO_2$ in the conductive phase of the thick film composition was raised from 30 to 100% by weight. The composition of the thick film compositions and the electrical properties of the fired resistors prepared thereby are given in Table 3, which follows:

TABLE 3

Composition of Thick Film Materials and Electrical Properties of Resistors Therefrom - Conductive Phase Variations

| Example No. | 12 | 13 | 14 | 15 | 16 |
|---|---|---|---|---|---|
| Thick Film Composition | | | | | |
| Conductive B | — | 56.00 | 39.20 | 33.60 | 22.40 |
| $SnO_2$ | 55.00 | — | 16.50 | 22.00 | 33.00 |
| Glass II | 18.80 | 17.80 | 18.10 | 18.18 | 18.38 |
| $CaF_2$ | 0.20 | 0.20 | 0.20 | 0.20 | 0.20 |
| Organic Medium | 26.00 | 26.00 | 26.00 | 26.00 | 26.00 |
| Resistor Electrical Properties | | | | | |
| $R_{av}(k\Omega/\square)$ | 3.94 | 13.650 | 8.047 | 7.160 | 5.520 |
| $\sigma_R(k\Omega/\square)$ | ±0.129 | ±0.258 | ±0.164 | ±0.075 | ±0.045 |
| $CV_R(\%)$ | 3.28 | 1.89 | 2.04 | 1.05 | 0.82 |
| $HTCR_{av}(ppm/°C.)$ | −144.6 | +20.1 | +36.5 | +37.4 | −24.4 |
| $\sigma_{HTCR}(ppm/°C.)$ | ±55.1 | ±15.9 | ±9.6 | ±8.9 | ±5.8 |
| $CV_{HTCR}(\%)$ | 38.1 | 79.1 | 26.4 | 24.0 | 23.7 |
| DT (μ) | 22.0 | 24.7 | 24.2 | 27.2 | 25.1 |
| $R_{av}(k\Omega/\square/mil)$ | 3.46 | 13.487 | 7.789 | 7.790 | 5.542 |

The foregoing data show that resistors below $10k\Omega/\square$ can be readily made by the addition of $SnO_2$ to the conductive phase, which further extends the useful layer of the compositions.

The data in both Tables 2 and 3 show that resistors made with the composition all have quite low $CV_R$ values. This fact is significant in that it indicates that the resistors will undergo very resistance drift after they are laser trimmed and that very little laser trimming will be required to make the desired resistor values.

I claim:

1. A glass which is suitable for use as a binder in high end resistors, which is substantially free of Bi, Cd and Pb and on a molar basis consists essentially of:
   A. 50-85% of glass forming materials consisting of 25-50% $B_2O_3$, 15-40% $SiO_2$, and 0.1-5% $SnO_2$, and
   B. 50-15% of glass modifying materials consisting of 10-30% BaO, 0-12% MgO and 1-10% NiO, providing that
      (1) the mole ratio $B_2O_3/SiO_2 \geq 0.8$; and
      (2) $\Sigma(B_2O_3+SiO_2) \geq 50$.

2. The glass of claim 1 in which the Group A materials constitute 65-75% and the Group B materials constitute 35-25%.

3. A composition which is comprised of 95-99% wt. of the glass of claim 1 and 5-0.1% wt. of a metal flouride selected from the group consisting of $CaF_2$, $BaF_2$, $MgF_2$, $SrF_2$, NaF, LiF, KF and $NiF_2$ and mixtures thereof.

4. A printable thick film resistor composition comprising a dispersion in organic medium of an admixture of finely divided particles of (a) 95-55% wt. tin oxide pyrochlore-based material and (b) 5-45% wt. of the glass of claim 1 or the composition of claim 3.

5. A resistor comprising a patterned thin layer of the composition of claim 4 which has been fired in a nonoxidizing atmosphere to effect volatilization of the organic medium and liquid phase sintering of the glass.

* * * * *